(12) United States Patent
Schmit et al.

(10) Patent No.: US 7,770,984 B2
(45) Date of Patent: Aug. 10, 2010

(54) TRACK BELT TENSION SYSTEM AND METHOD

(75) Inventors: Mike Schmit, Jackson, MN (US); Gene Shelhamer, Jackson, MN (US)

(73) Assignee: Agco Corporation, Duluth, GA (US)

( * ) Notice: Subject to any disclaimer, the term of this patent is extended or adjusted under 35 U.S.C. 154(b) by 0 days.

(21) Appl. No.: 11/851,785

(22) Filed: Sep. 7, 2007

(65) Prior Publication Data
US 2008/0224535 A1 Sep. 18, 2008

Related U.S. Application Data

(63) Continuation-in-part of application No. 11/686,402, filed on Mar. 15, 2007, now abandoned.

(51) Int. Cl.
*B62D 55/30* (2006.01)
(52) U.S. Cl. .................. 305/145; 305/149
(58) Field of Classification Search ............ 305/143, 305/144, 145, 149, 153, 155
See application file for complete search history.

(56) References Cited

U.S. PATENT DOCUMENTS

| | | | | |
|---|---|---|---|---|
| 4,458,954 A * | 7/1984 | Haas | ............................ | 305/144 |
| 6,024,183 A * | 2/2000 | Dietz et al. | .................. | 180/9.1 |
| 6,280,010 B1 * | 8/2001 | Oertley | ......................... | 305/144 |
| 6,305,763 B1 * | 10/2001 | Oertley | ......................... | 305/145 |
| 6,336,690 B2 * | 1/2002 | Toms et al. | .................. | 305/145 |
| 6,354,678 B1 * | 3/2002 | Oertley | ......................... | 305/144 |
| 6,682,155 B2 * | 1/2004 | Hoff et al. | ..................... | 305/145 |
| 6,929,334 B2 * | 8/2005 | Verheye et al. | .............. | 305/149 |
| 6,948,783 B2 * | 9/2005 | Hoff | ............................ | 305/144 |
| 7,172,257 B2 * | 2/2007 | Tamaru et al. | .............. | 305/145 |
| 7,296,862 B2 * | 11/2007 | Albright et al. | ............. | 305/145 |
| 2005/0035654 A1 * | 2/2005 | Tamaru et al. | .............. | 305/145 |

* cited by examiner

*Primary Examiner*—Jason R Bellinger
*Assistant Examiner*—Kip T Kotter
(74) *Attorney, Agent, or Firm*—Hovey Williams LLP

(57) ABSTRACT

A machine including: a frame assembly including one or more drive wheels and one or more idler wheels affixed to the frame assembly; a track belt disposed about the drive and the idler wheel; a hydraulic actuator arrangement including a hydraulic cylinder and accumulator affixed to the idler wheel that provides a force to tension the track belt; and a tension management system in operable communication with the hydraulic cylinder that maintains a pressure inside the hydraulic cylinder within a specified range.

4 Claims, 3 Drawing Sheets

TRACK BELT TENSION SYSTEM AND METHOD

CROSS REFERENCE TO RELATED APPLICATION

This application is a continuation of application Ser. No. 11/686,402, filed 15 Mar. 2007.

BACKGROUND OF THE INVENTION

1. Field of the Invention

The present invention relates generally to tensioning the track belts of a machine utilizing a friction drive between one or more drive wheels and track belts; and more particularly to controlling the pressure in the hydraulic cylinder that tensions the track belts.

2. Description of Related Art

It is well known to provide a machine having a frictional drive between a track belt and a drive wheel. In some applications, there is only one drive wheel and one track belt. In many other applications, a drive wheel and a track belt are located on both sides of the machine. In these applications, the respective track belt is wrapped around the drive wheel and an idler wheel. In order to control the tension on the track belt to ensure proper frictional drive forces between the drive wheel and the track belt, a force is applied to the idler wheel to force it further from the drive wheel. This force is applied by connecting a hydraulic cylinder to the idler wheel and applying pressurized fluid to the cylinder in order to push or pull the idler wheel. It is necessary to provide sufficient force on the track belt to ensure that the track belt does not slip relative to the wheel during varying operating conditions. Additionally, a higher than necessary force subjects the track belt and other associated components to extra wear and could result in premature failure of the track belt and or other associated components.

It has been known to apply an operator adjustable force to the track belt tensioning mechanism. However, the operator may not be aware that the track belt is slipping relative to the drive wheel, thus creating an inefficient operating system. Additionally, the operator may be applying a force that is much higher than needed, thus subjecting the track belt and the associated components to undue wear and/or premature failure.

The present invention is directed to overcoming one or more of the problems as set forth above.

BRIEF SUMMARY OF THE INVENTION

Briefly, described herein is a machine including: a frame assembly including one or more drive wheels and one or more idler wheels affixed to the frame assembly; a track belt disposed about the drive and the idler wheel; a hydraulic actuator arrangement including a hydraulic cylinder affixed to the idler wheel that provides a force to tension the track belt; and a tension management system in operable communication with the hydraulic cylinder that maintains a pressure inside the hydraulic cylinder within a specified range.

These and other objects, features and advantages of the present invention will become more apparent upon reading the following specification in conjunction with the accompanying drawing figures.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE PREFERRED EMBODIMENTS

Disclosed herein is a machine including: a frame assembly including one or more drive wheels and one or more idler wheels affixed to the frame assembly; a track belt disposed about the drive and the idler wheel; a hydraulic actuator arrangement including a hydraulic cylinder affixed to the idler wheel that provides a force to tension the track belt; and a tension management system in operable communication with the hydraulic cylinder that maintains a pressure inside the hydraulic cylinder within a specified range.

Figure 1:
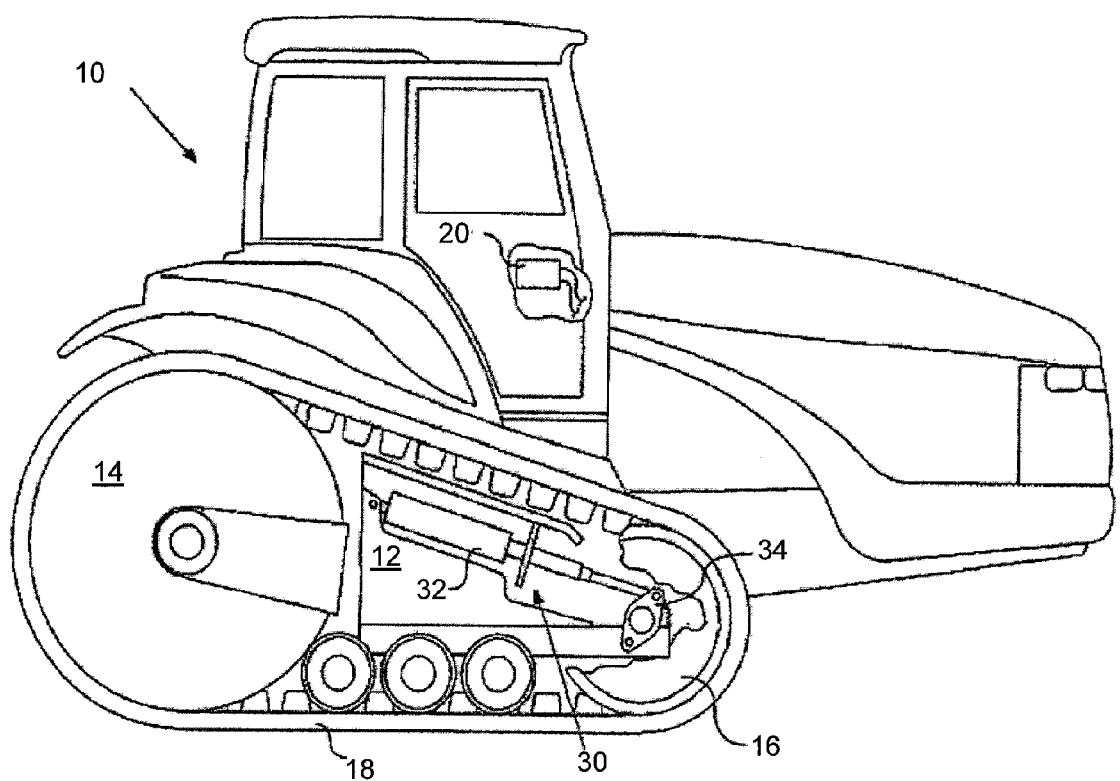
FIG. 1 is an illustration of a machine incorporating a track belt tension system in accordance with an exemplary embodiment of the present invention.

Referring to the drawings, and more particularly to FIG. 1, a machine 10 is illustrated. The machine 10 includes a frame assembly 12, drive wheels 14 and idler wheels 16 each disposed on opposite sides of the machine 10 with track belts 18 disposed about drive 14 and idler wheels 16. In exemplary embodiments, the frame assembly 12 could be one unitary frame, it could have a main machine frame with separate undercarriage frames attached thereto, or another suitable configuration. The machine 10 also includes a source of pressurized fluid, such as a pump, and a hydraulic actuator arrangement 30 that is designed to tension the track belts 18.

In exemplary embodiments, the hydraulic actuator arrangement 30 includes one or more hydraulic cylinder 32 and accumulator 42 that may be located on either or both sides of the machine 10. Each of the hydraulic cylinders 32 is connected on one end to the frame assembly 12 and on the other end to the respective idler wheel 16. In exemplary embodiments, the hydraulic cylinders 32 are capable of exerting either a pushing or pulling force on the respective idler wheel 16 to either increase or decrease the tension in the track belt 18. In exemplary embodiments, the idler wheels 16 may be independent of each other or the idler wheels 16 may be connected to each other by an axle assembly.

As illustrated in FIG. 1, the hydraulic cylinder 32 is capable of exerting a pushing force on the idler wheel 16 by exerting a pushing force on one end of a link 34. The link 34 is connected at one end to the frame assembly 12 with the idler wheel 16 connected to the link 34 between the connections points of the cylinder 32 and the frame assembly 12. It will be apparent to those of ordinary skill in the art that other arrangements for connecting the cylinder 32 to the idler wheel 16 can be utilized without departing from the essence of the present invention.

Providing an appropriate tension for the track belt 18 is important because if the track belt 18 tension is too low the track belt 18 may slip relative to the drive wheel 14 and create an inefficient operating system. Likewise, if the tension in the track belt 18 is too high the track belt 18 is subjected to undue wear that may result in premature failure of the track belt 18.

The tension in the track belt 18 is directly proportional to the magnitude of the frictional force between the respective drive wheels 14 and its associated track belt 18, which is directly proportional to the pressure in the hydraulic cylinder 32. Maintaining a constant or near constant pressure in the hydraulic accumulator 42 can be difficult because the pressure in the hydraulic cylinder 32 often fluctuates due to changes in environmental conditions such as ambient temperature.

In exemplary embodiments, the hydraulic cylinder 32 is connected to a pressure management system 40, which adjusts the pressure in the hydraulic actuator arrangement 30 to compensate for changes in the environmental conditions. For example, the pressure management system 40 increases the pressure in the hydraulic actuator arrangement 30 if the pressure falls below a minimum preset pressure, such a drop in pressure may result from a drop in the ambient temperature. Likewise, the pressure management system 40 decreases the pressure in the hydraulic actuator arrangement 30 if the pressure rises above a maximum preset pressure, such an increase in pressure may result from an increase in the ambient temperature. In exemplary embodiments, a user can set and/or adjust the maximum acceptable pressure in the hydraulic actuator arrangement 30.

Figure 2:
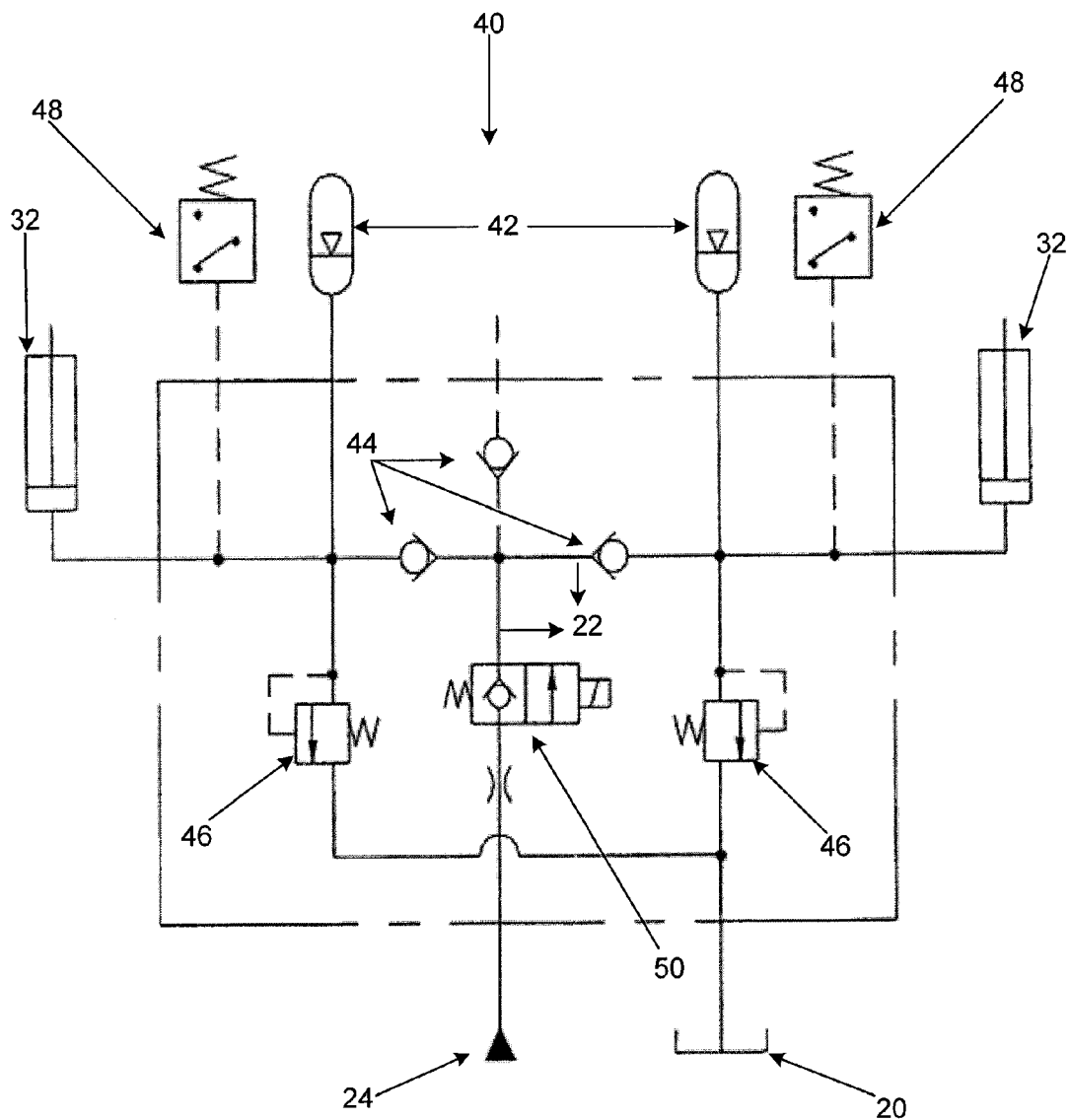
FIG. 2 is a schematic representation of a pressure management system in accordance with an exemplary embodiment of the present invention.

Referring now to FIG. 2, a schematic representation of an exemplary embodiment of a pressure management system 40 is illustrated. In exemplary embodiments, the pressure management system 40 includes a pressure switch for each hydraulic actuator arrangement 30, both of which actuate a charging valve 50 to increase the pressure in the corresponding hydraulic actuator arrangement 30 to above the minimum pressure when temperature decreases result in a pressure lower than the set minimum pressure. Additionally, the pressure management system 40 includes one or more relief valves 46 to drain excess hydraulic fluid from the hydraulic actuator arrangement 30 if the pressure in the hydraulic cylinder 32 increases above the maximum preset pressure.

In one exemplary embodiment, the pressure management system 40 may also include one or more pressure sensors 48 that are used to sense the pressure in the hydraulic cylinder 32 and responsively actuate either the charging valve 50 or the relief valves 46, which may be electrically actuated control valves. The electrically actuated control valves may have infinitely variable controls or may have finite valve operating positions. In another exemplary embodiment, the charging valve 50 or the relief valves 46 may be mechanically actuated control valves that have a first position, at which fluid can flow freely through the valve, and a spring-biased second position, at which fluid flow is blocked. The mechanically actuated control valves may have an adjustable bias point at which the position of the valve changes from the first position to the second position. The pressure management system 40 may further include a charging valve 50 disposed between the supply 24 and the system isolation check valves 44, the charging valve 50 is designed to control the pressure of the hydraulic fluid supplied through the check valves 44. Thus, the check valves 44 are each fluidly interconnected between a respective hydraulic actuator arrangement 30 and the charging valve 50 to permit pressurizing flow of hydraulic fluid from the charging valve 50 to the respective hydraulic actuator arrangement 30 and prevent reverse fluid flow therebetween. Furthermore, the check valves are fluidly connected to prevent flow between the hydraulic actuator arrangements 30.

In exemplary embodiments, either or both of the check valve 44 or the relief valves 46 can be connected to the supply 24 by one or more conduits 22. Additionally, a supply 24 may be connected between the reservoir 20 and the charging valve 50 to pressurize the fluid in a portion of the conduit 22 and pump a pressurizing flow of hydraulic fluid from the reservoir 20 to the hydraulic cylinder 32. In another exemplary embodiment, a controller may be connected to the pressure sensors 48, the charging valve 50, the relief valves 46, and/or the supply 24 to monitor the pressure in the hydraulic cylinder 32 and responsively control the charging valve 50, the relief valves 46, and/or the supply 24.

In one embodiment the acceptable pressure range for the hydraulic cylinder 32 may be from 2500 PSI to 3300 PSI. In this embodiment, the relief valves 46 are designed to reduce the amount of hydraulic fluid in the hydraulic cylinder 32 once the pressure sensor 48 indicates that the pressure in the hydraulic cylinder 32 is above 3300 PSI by opening to permit draining of excess fluid from the hydraulic cylinder 32 to the reservoir 20. Likewise, the charging valve 50 is designed to increase the amount of hydraulic fluid in the hydraulic cylinder 32 once the pressure sensor 48 indicates that the pressure in the hydraulic cylinder 32 is below 2500 PSI by opening to permit pumping of fluid into the hydraulic cylinder 32 from the reservoir 20. Furthermore, the charging valve 50 and/or the supply 24 are designed to provide a pressurized source of hydraulic fluid to the charging valves with a pressure of at least 2950 PSI.

Figure 3:
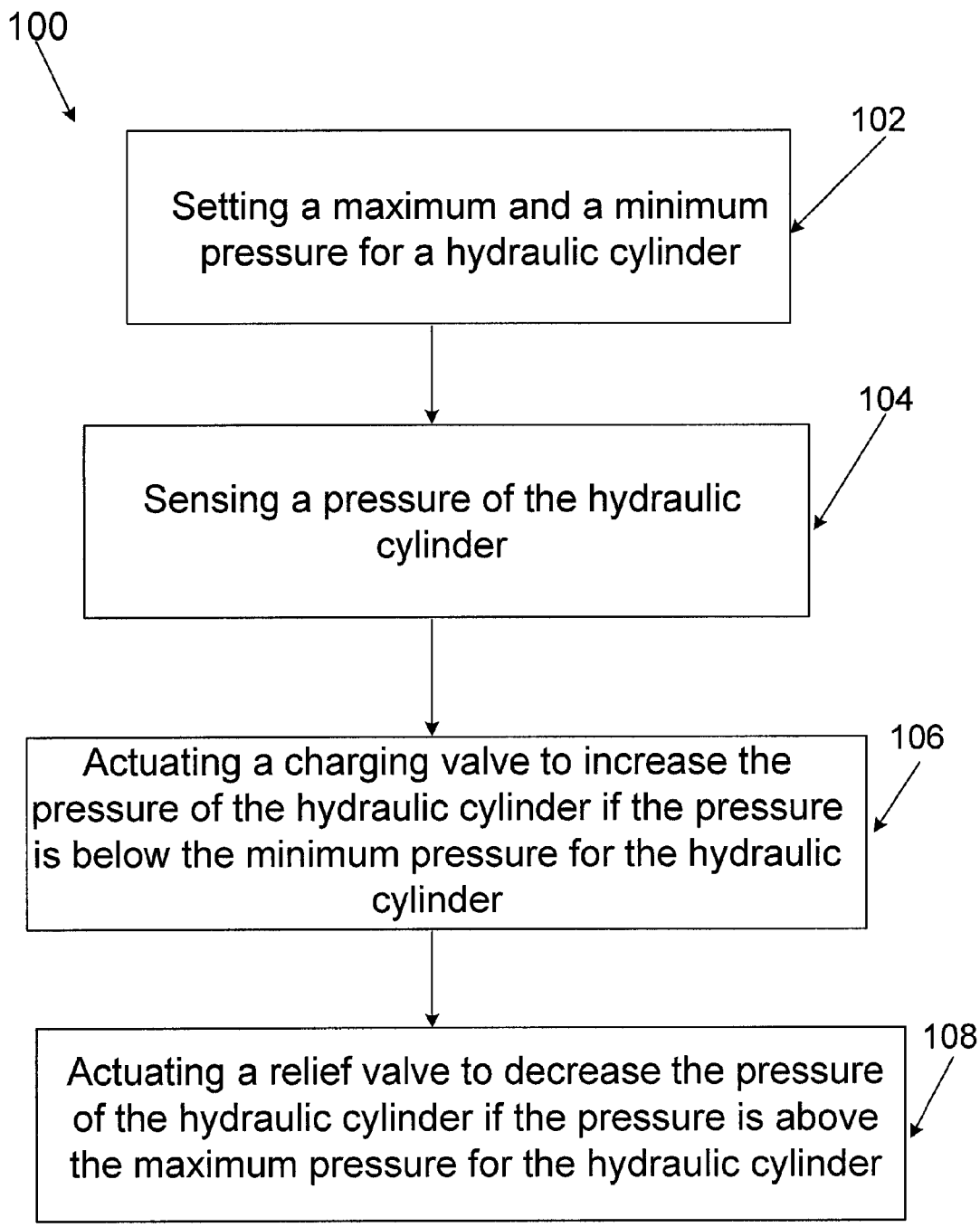
FIG. 3 is a flow chart representation of an exemplary method for maintaining tension in a track belt.

Turning now to FIG. 3, a flow chart depicting an exemplary embodiment of a method for providing improved track belt tension is generally illustrated as 100. The method 100 includes setting a maximum and a minimum pressure for a hydraulic cylinder, as shown at method step 102. The method 100 also includes, as shown at method step 104, sensing a pressure of the hydraulic cylinder. After a minimum pressure has been set for the hydraulic cylinder, the method 100 includes actuating a charging valve to increase the pressure of the hydraulic cylinder if the pressure is below the minimum pressure for the hydraulic cylinder, as shown at method step 106. Likewise, after a maximum pressure has been set for the hydraulic cylinder, the method 100 includes actuating a relief valve to decrease the pressure of the hydraulic cylinder if the pressure is above the maximum pressure for the hydraulic cylinder, as shown at method step 108.

While the exemplary embodiments of the invention have been described, it will be understood that those skilled in the art, both now and in the future, may make various improvements and enhancements, which fall within the scope of the claims that follow. These claims should be construed to maintain the proper protection for the invention first described.

What is claimed is:

1. A tracked vehicle comprising:
   a frame;
   a pair of friction drive track assemblies that each include a drive wheel and an idler wheel, with the idler wheels shiftably mounted to the frame,
   said pair of track assemblies each including a track belt entrained about a respective drive wheel and a respective idler wheel;
   a pair of hydraulic actuator assemblies that each include a hydraulic cylinder,
   said hydraulic cylinders each operably attached to the respective idler wheel to tension the corresponding track belt in response to a hydraulic pressure within the hydraulic actuator assembly and thereby maintain frictional driving engagement between the drive wheel and track belt,
   said pair of hydraulic actuator assemblies each including an accumulator in fluid communication with a respective hydraulic cylinder;
   a reservoir of hydraulic fluid;

a pump in fluid communication with the reservoir to pump a pressurizing flow of hydraulic fluid from the reservoir to the hydraulic actuator assemblies;

a pair of relief valves that are each fluidly interconnected between a respective hydraulic actuator assembly and the reservoir and are operable to selectively permit hydraulic fluid to drain from the respective hydraulic actuator assembly to the reservoir when the pressure in the respective hydraulic actuator assembly exceeds a predetermined maximum pressure;

a single charging valve that is fluidly interconnected between the pump and the hydraulic actuator assemblies, with the single charging valve operably coupled to both actuator assemblies to permit the pressurizing flow of hydraulic fluid to be pumped from the pump to the actuator assemblies; and a pair of pressure switches that are each associated with a corresponding frictionally engaged drive wheel and track belt and fluidly coupled to a respective hydraulic actuator assembly to sense the corresponding hydraulic pressure therein and thereby monitor frictional engagement between the corresponding drive wheel and track belt, said pressure switches being operably coupled to the single charging valve to open the charging valve when either one of the sensed hydraulic pressures of the hydraulic actuator assemblies is less than a predetermined minimum pressure, with the charging valve thereby fluidly connecting both actuator assemblies to the pump so that hydraulic fluid is available to be supplied to both actuator assemblies whenever either switch senses a drop of hydraulic pressure below the predetermined level.

2. The tracked vehicle as claimed in claim 1, said charging valve comprising a two-position valve with an open position that permits pressurizing flow of hydraulic fluid to the hydraulic actuator assemblies and a closed position that prevents pressurizing flow to the hydraulic actuator assemblies.

3. The tracked vehicle as claimed in claim 2; and a pair of check valves each fluidly interconnected between a respective hydraulic actuator assembly and the charging valve to permit pressurizing flow of hydraulic fluid from the charging valve to the respective hydraulic actuator assembly and prevent reverse fluid flow therebetween.

4. The tracked vehicle as claimed in claim 3, said check valves being fluidly connected to prevent flow between the hydraulic actuator assemblies.

\* \* \* \* \*